(12) United States Patent
Liu et al.

(10) Patent No.: US 8,136,345 B2
(45) Date of Patent: Mar. 20, 2012

(54) INTERNAL COMBUSTION ENGINE EXHAUST TREATMENT HAVING A SINGLE VALVE DIRECTING EXHAUST TO DUAL NOX TRAPS

(75) Inventors: Ke Liu, Margarita, CA (US); John G. Buglass, Glastonbury, CT (US)

(73) Assignee: Shell Oil Company, Houston, TX (US)

( * ) Notice: Subject to any disclaimer, the term of this patent is extended or adjusted under 35 U.S.C. 154(b) by 2215 days.

(21) Appl. No.: 10/946,206

(22) Filed: Sep. 21, 2004

(65) Prior Publication Data

US 2006/0059896 A1 Mar. 23, 2006

(51) Int. Cl.
*F01N 3/00* (2006.01)
(52) U.S. Cl. .......... 60/286; 60/287; 60/295; 60/297; 60/301; 60/303
(58) Field of Classification Search ........ 60/274, 60/275, 286–288, 295, 297, 301, 303, 311; 422/169–171, 177, 182, 183
See application file for complete search history.

(56) References Cited

U.S. PATENT DOCUMENTS

| | | | | |
|---|---|---|---|---|
| 5,974,791 A | * | 11/1999 | Hirota et al. | 60/276 |
| 6,105,365 A | * | 8/2000 | Deeba et al. | 60/274 |
| 6,170,259 B1 | * | 1/2001 | Boegner et al. | 60/286 |
| 6,560,958 B1 | * | 5/2003 | Bromberg et al. | 60/275 |
| 6,679,051 B1 | | 1/2004 | van Nieustadt et al. | |
| 6,708,486 B2 | * | 3/2004 | Hirota et al. | 60/297 |
| 6,742,328 B2 | * | 6/2004 | Webb et al. | 60/285 |
| 6,745,560 B2 | * | 6/2004 | Stroia et al. | 60/286 |
| 6,779,339 B1 | * | 8/2004 | Laroo et al. | 60/297 |
| 6,832,473 B2 | * | 12/2004 | Kupe et al. | 60/286 |
| 6,843,054 B2 | * | 1/2005 | Taylor et al. | 60/275 |
| 6,895,746 B2 | | 5/2005 | Buglass et al. | 60/286 |

* cited by examiner

*Primary Examiner* — Thomas Denion
*Assistant Examiner* — Diem Tran

(57) ABSTRACT

A single valve (23, 50) directs engine exhaust (11, 12) toward alternative NOx traps (19, 20) which are adjacent to either diesel particulate filters (40, 41) or low temperature water gas shift catalysts (63, 64). Syngas is either provided from a source (54) or by in-line catalytic partial oxidizers (23, 24) which may have diesel oxidation catalysts ahead of them in the flow and which receive fuel from the engine fuel source (26) through nozzles (27, 28).

1 Claim, 3 Drawing Sheets

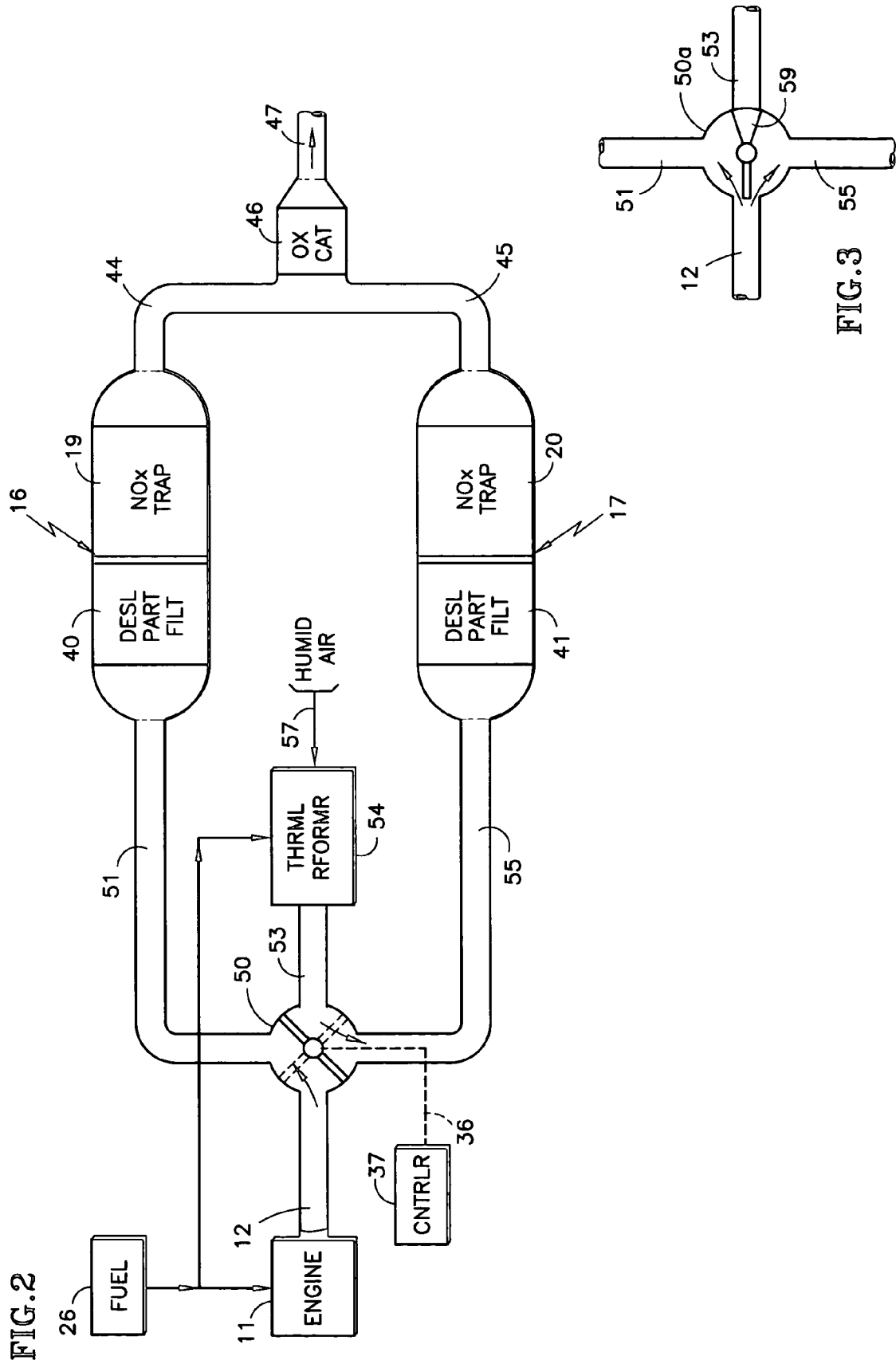

INTERNAL COMBUSTION ENGINE EXHAUST TREATMENT HAVING A SINGLE VALVE DIRECTING EXHAUST TO DUAL NOX TRAPS

TECHNICAL FIELD

This invention relates to internal combustion engine exhaust aftertreatment in which dual NOx traps are regenerated by a reductant gas, the dual NOx traps having exhaust directed alternatively thereto by a single exhaust valve.

BACKGROUND ART

It is known to utilize a bed of adsorbent, such as barium carbonate, to collect oxides of nitrogen from the exhaust of an internal combustion engine, and periodically regenerating the adsorbent by means of a gas containing hydrogen and carbon monoxide, which may be referred to as "syngas".

In copending U.S. patent application Ser. No. 10/159,369, filed May 31, 2002, such a system employing a pair of NOx traps utilizes four valves, two high temperature exhaust valves alternatively directing the exhaust to one NOx trap or the other, and the other pair of valves alternatively directing syngas to the second trap or the first trap. The high temperature exhaust valves are expensive, cumbersome, and subject to leaks. When exhaust leaks into the same stream with the syngas, the oxygen in the exhaust reacts with the hydrogen in the syngas, which is a waste of syngas, and which can lead to dangerous situations. A four valve system can be difficult to control properly.

Problems that are encountered with the generation of syngas include the fact that if a catalytic partial oxidizer is used, the temperature may be sufficiently low so that the CPO will not light off (begin the combustion process) at the temperature of the flow therein.

Problems with some of the deNOx catalysts include that steam or water in the exhaust stream will reduce the activity of the catalyst, such as in the decomposition of the reducted $N_2O$.

DISCLOSURE OF INVENTION

According to the present invention, a single, high temperature valve is used to direct engine exhaust alternately to a first NOx trap and a second NOx trap, thereby eliminating the need for additional high temperature valves for directing the exhaust in an alternative fashion.

In a first configuration of the invention, a three position, two outlet, one inlet valve is used to divert most of the exhaust to a first NOx trap and a small amount of exhaust to a second NOx trap in a first position, and then to divert most exhaust to the second trap and a small amount of exhaust to the first trap. The small amount of exhaust is used to provide heat, oxygen and moisture to a respective hydrocarbon fuel reformer disposed between the valve and each NOx trap. This configuration may have a respective diesel particulate filter bed disposed in serial flow relationship with each NOx trap.

In a second configuration of the invention employing a two position, two outlet, two inlet high temperature valve, one inlet is connected to engine exhaust and the other inlet is connected to a source of syngas, the two position valve alternating the direction of exhaust flow between a first NOx trap and a second NOx trap; one embodiment includes a respective diesel particulate filter bed in serial flow relationship with each NOx trap and another embodiment includes a respective low temperature water gas shift reactor catalyst bed upstream of each NOx trap, with one or more diesel particulate filters disposed in the exhaust stream downstream or upstream of the NOx traps.

In a third configuration of the invention employing a two position, two outlet, two inlet high temperature valve for alternatively directing the flow of exhaust to a first NOx trap or a second NOx trap, a respective water adsorption bed is disposed upstream of each NOx trap, one inlet of the valve being connected to exhaust and the other inlet being connected to a source of dry air, there being a respective hydrocarbon fuel reformer upstream of each water adsorption bed.

In any of the aforementioned embodiments, one or more exhaust oxidation catalysts may be disposed in the exhaust flow downstream from the NOx traps.

In the first and third configurations, an oxidation catalyst may operate upstream of a CPO reformer to raise the temperature of the gas to ensure that the CPO will light-off.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2 is a stylized, simplified schematic of a first embodiment of a second configuration.

FIG. 3 is a fractional view of a modification of FIG. 2 in which the exhaust valve has three positions.

MODE(S) FOR CARRYING OUT THE INVENTION

Figure 1:
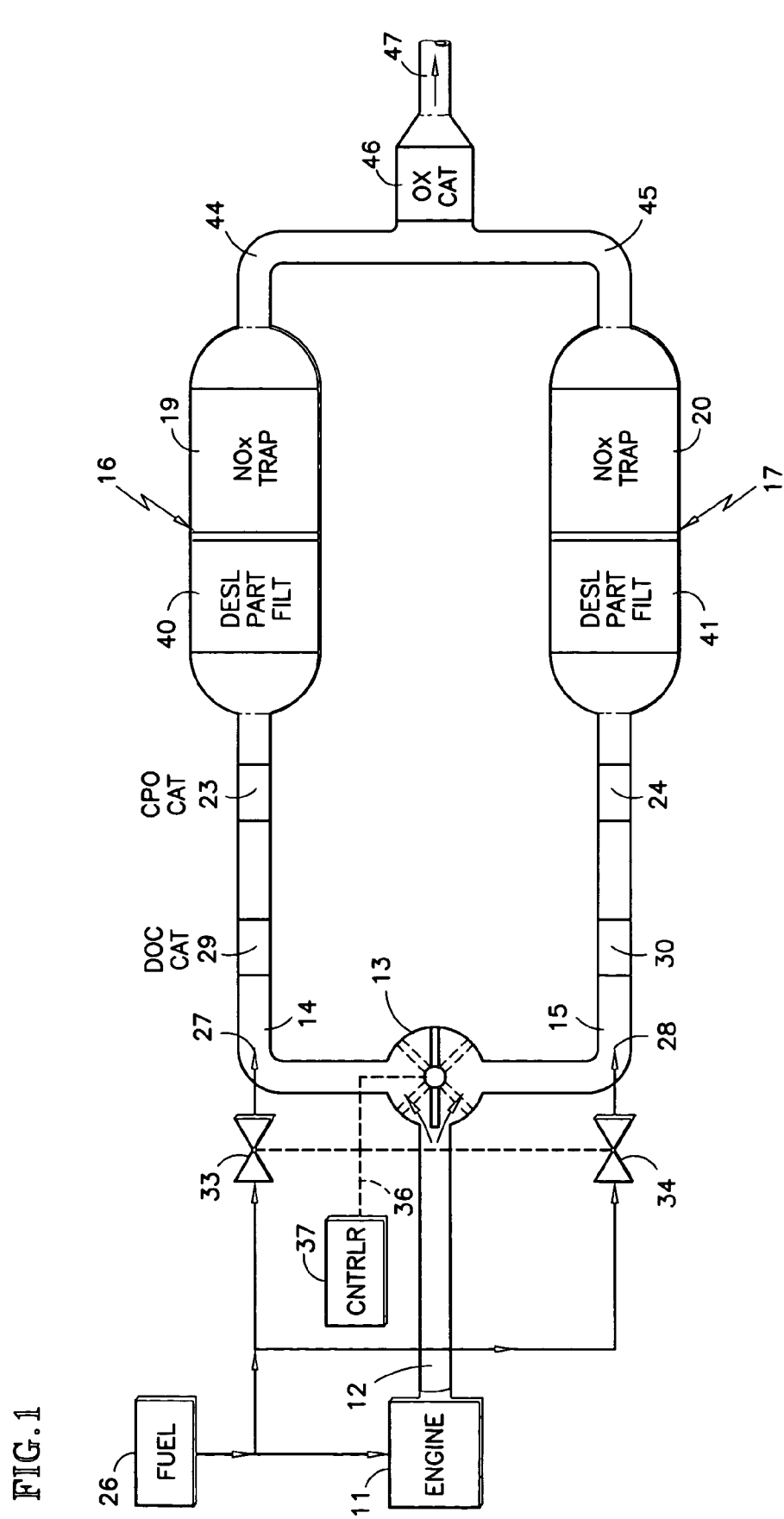
FIG. 1 is a stylized, simplified schematic of a first configuration of a single valve NOx trap system according to the invention.

Referring to FIG. 1, the exhaust of an engine 11 is fed through an exhaust pipe 12 to a single valve 13 which is capable of being moved into one of three positions. In a first position, shown solid in FIG. 1, exhaust flows through the valve 13 into a pair of pipes 14, 15 which lead to corresponding beds 16, 17, including NOx traps 19, 20, sometimes referred to as lean NOx traps (LNTs), which may comprise an adsorber such as barium carbonate. Each of the pipes 14, 15 has a catalytic partial oxidizer (CPO) catalyst bed 23, 24 which in addition to exhaust, is fed engine fuel from a source 26 through respective nozzles 27, 28. If desired, as an option, each of the pipes 14, 15 may also have an oxidation catalyst bed 29, 30 (such as a diesel oxidation catalyst bed), which raises the temperature of the gas entering the CPO (or other reformer) so that it will light-off.

The valve 13 is also positional to either of two positions shown in dotted lines in FIG. 1, in which substantially all of the exhaust flows to one of the beds 16, 17, and a small fraction of the exhaust will flow to the other of the beds. The small fraction of exhaust is used to maintain the generation of reformate gas containing hydrogen and carbon monoxide, sometimes referred to as "syngas" in the CPO catalysts 23 or 24 as the case may be. If desired, the delivery of fuel to the respective nozzles 27, 28 may be controlled by valves 33, 34 in synchronism with the positioning of the valve 13, in response to signals 36 from a controller 37 so that fuel is dispensed only during the regeneration of the NOx traps. Since regeneration can take place in about 10% of the time of a repetitive absorption/regeneration cycle, the valve 13 may be in the position shown in FIG. 1 60% of the time, and in one or the other of the positions shown dotted in FIG. 1 for 10% of the time each.

In the first configuration of FIG. 1, there may be disposed in serial flow relationship with each of the NOx traps 19, 20 a respective diesel particulate filter bed 40, 41. The diesel particulate filter beds 40, 41 may be disposed upstream of the NOx traps 19, 20 as shown in FIG. 1, or may be disposed downstream from the NOx traps 19, 20. In the first case, heat generated in the combustion of particulates in the diesel particulate filter during filter regeneration supports the regeneration of the NOx traps; in a position downstream of the NOx trap, the total heat content of the exhaust gas is used to heat the NOx trap to improve performance. Thus, there are advantages either way; either arrangement is within the purview of the present invention.

The outflow of the NOx traps in pipes 44, 45 is passed through an oxidation catalyst 46 before reaching the ultimate exhaust outflow pipe 47. This catalyst simply combusts a number of gases, such as hydrocarbons and CO before allowing the exhaust to be released to the ambient environment.

In the first configuration of FIG. 1, instead of the CPO catalyst 23, 24, other suitable hydrocarbon fuel reformers may be utilized, such as an autothermal reformer (ATR), a non-catalytic, homogenous partial oxidizer (CPO), or a plasma reformer.

In FIG. 2, one embodiment of a second configuration of the invention includes a two position, two outlet, two inlet valve 50 which alternatively diverts substantially all of the exhaust through a pipe 51 to the first NOx trap 19 while directing syngas in a pipe 53 from a thermal reformer 54 through a pipe 55 to the second NOx trap. In a second position (shown dotted in FIG. 2), the valve 50 directs substantially all of the exhaust through the pipe 55 to the second NOx trap while directing syngas through the pipe 51 to the first NOx trap. The thermal reformer receives fuel from the source 26 and humidified air on a line 57.

Referring to FIG. 3, a modification of the exhaust valve 50a includes a sufficiently large lobe 59 to close off the pipe 53 when in a third position as shown in FIG. 3, whereby to divide the exhaust gas to both of the NOx traps 19, 20 for a significant fraction of each cycle, as described with respect to FIG. 1.

Figure 4:
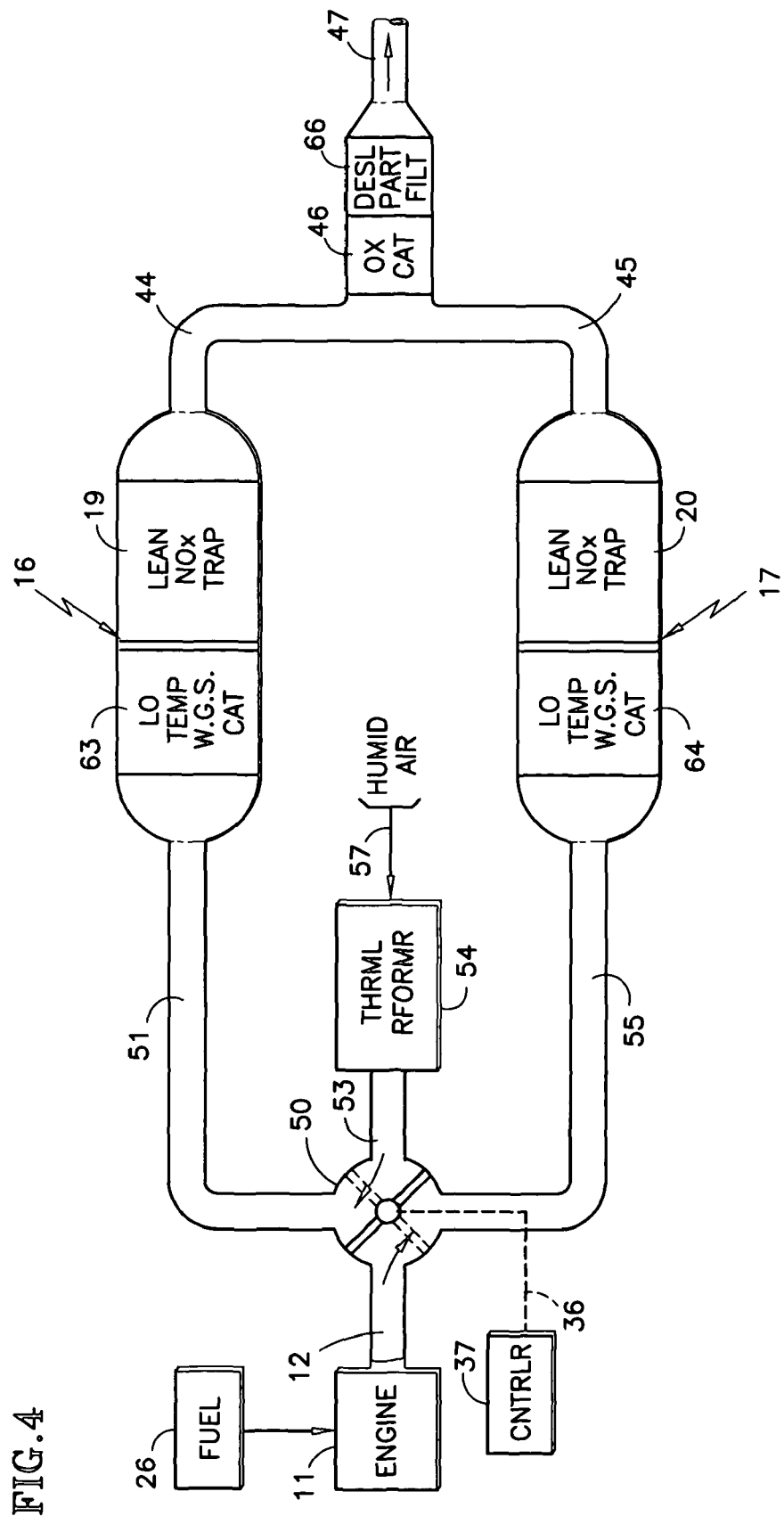
FIG. 4 is a stylized, simplified schematic of a second embodiment of the second configuration.

Referring to FIG. 4, another embodiment of the second configuration of the invention provides a respective low temperature water gas shift reactor catalyst bed 63, 64 upstream of the NOx traps 19, 20 so as to convert carbon monoxide in the syngas and moisture in the engine exhaust into carbon dioxide and hydrogen, so as to increase the amount of hydrogen available for regeneration of the NOx traps. In this case, a diesel particulate filter 66 may be placed in serial flow relationship with the oxidation catalyst 46, if desired. The diesel particulate filter 66 may be either upstream or downstream from the oxidation catalyst 46, as may be desired in any particular implementation of the invention.

The embodiment of FIG. 4 may utilize the modified valve 50a of FIG. 3, if desired in any implementation of the present invention. The water gas shift reactors of the invention may be fed by valves other than the one-piece valves disclosed herein, such as those in the aforementioned application, or, other suitable valves, within the purview of the invention.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. Apparatus for reducing oxides of nitrogen (NOx) in the exhaust of an internal combustion engine which has a source of fuel and generates exhaust in an exhaust pipe, comprising:

first and second NOx traps which reduce NOx in exhaust that passes therethrough;

a single exhaust valve having two outlets and at least one inlet, said exhaust pipe connected to said one inlet, said valve having at least a first position in which substantially all of the exhaust flowing in said exhaust pipe is directed through a first one of said outlets to said first one of said NOx traps and a second position in which substantially all of the exhaust flowing in said exhaust pipe is directed through a second one of said outlets to a second one of said NOx traps;

a respective hydrocarbon fuel reformer disposed between each of said outlets and each of said NOx traps, each reformer receiving fuel from said source; and a pair of oxidation catalysts, each disposed in serial flow relationship between a respective one of said reformers and a related one of said outlets;

said valve alternatively directing said exhaust to one or the other of said NOx traps through a corresponding one of said reformers.

* * * * *